United States Patent [19]

Misaka et al.

[11] 4,042,500
[45] Aug. 16, 1977

[54] FLUIDIZED-BED TYPE MULTISTAGE SOLID-LIQUID CONTACT APPARATUS

[75] Inventors: Yasunao Misaka; Ikuo Tanaka, both of Yokohama; Hiroo Okada, Sagamihara; Chuichi Goto; Moriyuki Hirota, both of Yamato; Masaaki Uesugi; Mitsuru Tsuchiya, both of Yokohama, all of Japan

[73] Assignee: Kurita Water Industries Limited, Osaka, Japan

[21] Appl. No.: 581,657

[22] Filed: May 28, 1975

[30] Foreign Application Priority Data

June 3, 1974 Japan .................. 49-61796
June 3, 1974 Japan .................. 49-61797
June 3, 1974 Japan .................. 49-61799

[51] Int. Cl.$^2$ ........................................... B01D 33/30
[52] U.S. Cl. ............................. 210/189; 210/268
[58] Field of Search ............... 23/270 R; 210/20, 33, 210/189, 268, 290

[56] References Cited

U.S. PATENT DOCUMENTS

| | | | |
|---|---|---|---|
| 2,441,724 | 5/1948 | Simpson | 210/268 |
| 2,632,720 | 3/1953 | Perry | 210/268 |
| 2,742,381 | 4/1956 | Weiss et al. | 210/20 |
| 3,313,725 | 4/1967 | Tsuda et al. | 210/189 |
| 3,802,567 | 4/1974 | Kunz | 210/189 |

Primary Examiner—Thomas G. Wyse
Assistant Examiner—Ivars Cintins
Attorney, Agent, or Firm—Oblon, Fisher, Spivak, McClelland & Maier

[57] ABSTRACT

Disclosed are improvements in and relating to a fluidized-bed type multistage solid-liquid contact apparatus which comprises a contact column incorporating therein a multiplicity of a spaced and horizontal support plates each carrying thereon a fluidized bed of solid particles and having a downcomer for communicating between the upper and lower sides of the plate, a storage tank for the liquid to be treated by contact with said layer of fluidized solid particles in said contact column, a storage tank for receiving the treated liquid and a storage tank for solid particles for use in said layers. In the improved fluidized-bed type multistage solid-liquid contact apparatus, the storage tank for solid particles is provided with a metering tank, the support plate in each stage is composed of one upper and one lower perforated plate and, in case where the downcomer is pierced through the support plate, the inside diameter of the tube is larger in the upper portion than in the lower portion and the forward end of the pipe used for delivering the solid particles to the contact column opens therein in a horizontal direction.

6 Claims, 9 Drawing Figures

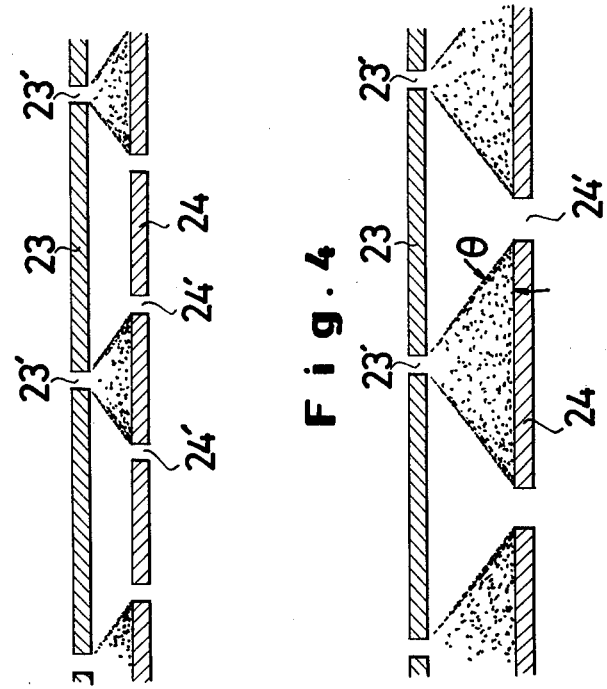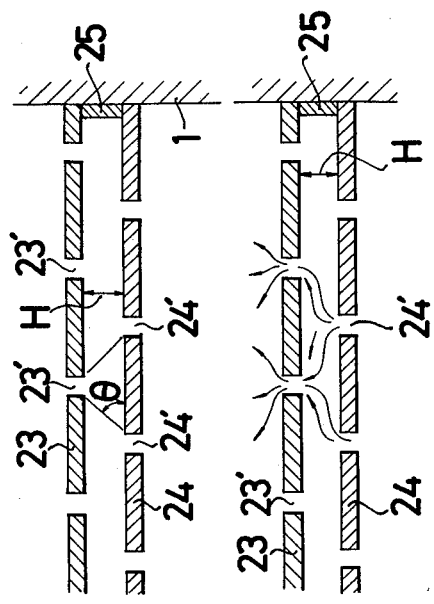

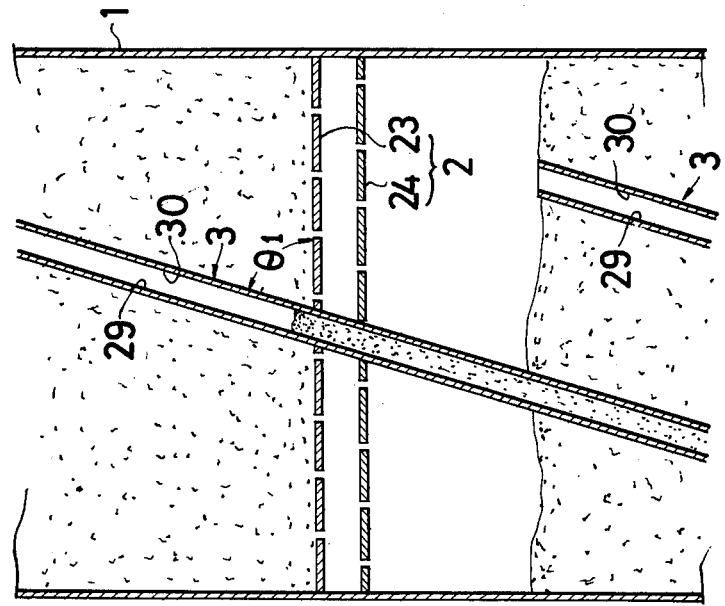
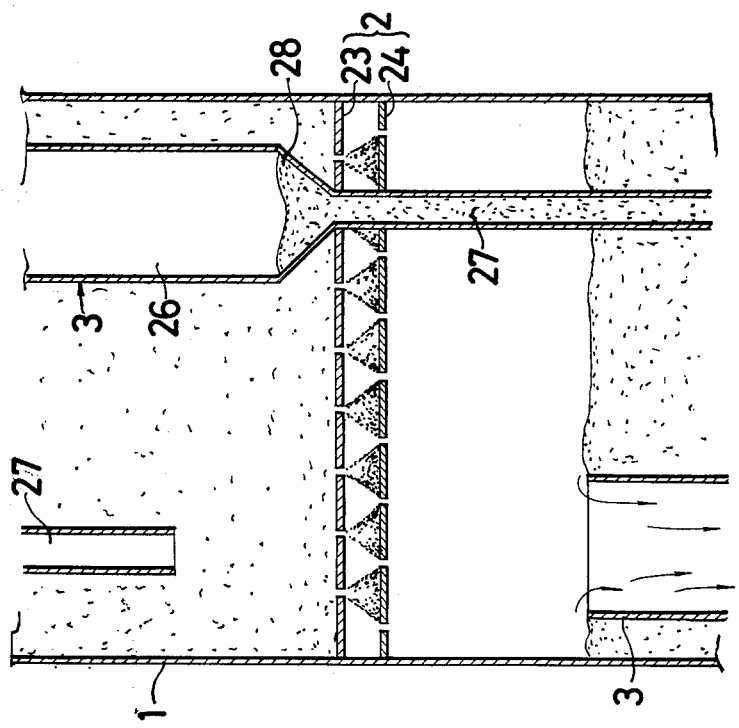

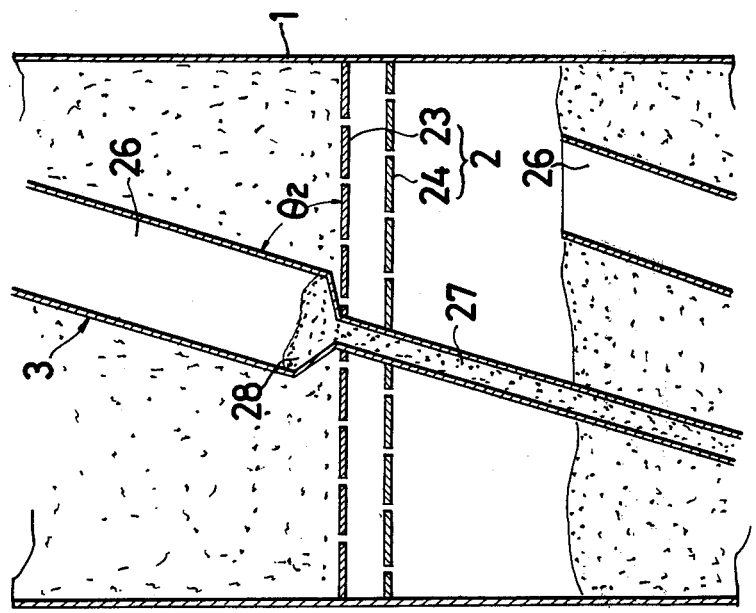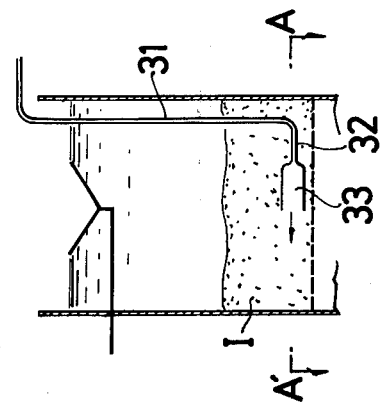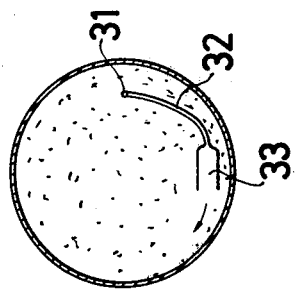

FLUIDIZED-BED TYPE MULTISTAGE SOLID-LIQUID CONTACT APPARATUS

BACKGROUND OF THE INVENTION

This invention relates to improvements in and relating to a fluidized-bed type multistage solid-liquid contact apparatus.

The known fluidized-bed type multistage solid-liquid contact apparatus is an integral apparatus which comprises (1) a contact column which consists of a vertical column, a multiplicity of horizontal support plates of water-pervious structure such as perforated plates disposed in the form of multistage shelves within said vertical column, said support plates in the respective shelves excepting the lowermost one being provided each with a tube adapted to permit communication between the upper side and lower side thereof, and a fluidized bed of solid particles such as of activated carbon, ion-exchange resin or the like formed on each of said support plates, (2) a crude liquid tank for storing a crude liquid to be delivered to said contact column for treatment therein, (3) means for delivering said crude liquid from said crude liquid tank to the space below the lowermost support plate in said contact column, (4) a treated liquid tank for storing liquid discharged from said contact column, (5) means for delivering said treated liquid from the space above the uppermost support plate of said contact column to said treated liquid tank and (6) means for delivering solid particles to the space above the uppermost support plate in said contact column and means for discharging solid particles from the lowermost support plate in said contact column. The solid particles for fluidized bed are gradually delivered downwardly through the head of the contact column and the crude liquid is continuously introduced into the space below the lowermost support plate in the contact column and allowed to flow up the interior of the contact column. Consequently, solid particles are fluidized on the support plates to form contact layers generally called "fluidized bed", in which layers the solid particles and the crude liquid come into mutual contact. Depending on the particular kind of liquid and solid particles in use, this contact causes a chemical or physical change in the crude liquid. By the time the liquid rises above the uppermost support plate and flows out of the contact column, said chemical or physical change has been completed. Consequently, the liquid thus discharged from the head of the contact column corresponds to what has been referred to as "treated liquid" above. In this conventional apparatus, however, means capable of accurate metering is not incorporated. Therefore, it fails to provide quantitative treatment, though it permits qualitative treatment of the liquid.

Further, in the contact column, the crude liquid flows continuously up the column interior while successively passing the support plates and the solid particles gradually move down the column interior via the downcomers. In this manner, solid particles which have been degraded in activity are gradually discharged through the column bottom and fresh supply of solid particles is introduced through the column head.

It is possible in this case that the downward flow of solid particles via the downcomers will be obstructed by the upward flow of the crude liquid and immobilized solid particles will consequently collect in a heap on one of the multistage shelves even to the extent of blocking the interior of the column completely. As a result, in the support plates below the blocked shelf, downward flow of solid particles alone is permitted to proceed and the supply of solid particles through the column head is stopped. Such phenomenon as this could result in the total absence of solid particles from the column.

The present invention is directed to improving the fluidized-bed type multistage solid-liquid contact apparatus.

A primary object of this invention, therefore, is to provide a fluidized-bed type multistage solid-contact apparatus which permits accurate metering of solid particles to be used therein.

Another object of this invention is to provide a fluidized-bed type multistage solid-liquid contact apparatus which enables the supply of solid particles and the supply of crude liquid to be effected smoothly within the contact column.

BRIEF SUMMARY OF THE INVENTION

To accomplish the objects described above, the means for delivering solid particles to and discharging degraded solid particles from the contact column of the present invention is provided with a storage tank for solid particles and a tank adapted for metering solid particles being delivered to the contact column.

This invention further has each of the support plates within the contact column formed of two perforated plates which contain peforations in such way that the perforations in the upper perforated plate and those in the lower perforated plate are staggered and the ratio of perforations (the ratio of the combined area of perforations bored in the plate to the total area of plate) is greater in the lower perforated plate than in the upper perforated plate. It also has each of the downcomers disposed to pass vertically or slantingly through the respective support plate. Owing to these improvements, the present invention enables the contact column to be smoothly operated without entailing trouble such as blocking of the column interior with the solid particles.

In the case of downcomers which pierce through the support plates, the present invention also embraces an improvement which is brought about by giving a larger inside cross-sectional area to the upper portion than to the lower portion of the tubes as, for example, by forming the upper portion of each tube in the shape of a funnel or increasing the inside cross-sectional area in the upper portion of each tube to 2 to 30 times that in the lower portion thereof.

As to the means for the delivery of solid particles, this invention has the forward end of the delivery pipe open in a horizontal direction into the space above the uppermost support plate inside the contact column, so that the delivery of solid particles to the contact column will be smoothly effected without disturbing the state of solid-liquid equilibrium inside the contact column.

The other characteristics and advantages of the present invention will become apparent from the description given herein below with reference to the accompanying drawings.

BRIEF EXPLANATION OF THE DRAWINGS

FIG. 2 is an explanatory model diagram illustrating one preferred embodiment of the support plate for use in the contact column.

FIG. 3 is an explanatory model diagram illustrating another preferred embodiment of the support plate for use in the contact column.

FIG. 4 is an explanatory model diagram illustrating still another preferred embodiment of the support plate for use in the contact column.

FIG. 5 is an explanatory model diagram illustrating one preferred embodiment of the downcomer.

FIG. 6 is an explanatory model diagram illustrating another preferred embodiment of the downcomer.

FIG. 7 is an explanatory model diagram illustrating still another preferred embodiment of the downcomer.

FIG. 8 is a sectional model diagram illustrating the pipe for delivering solid particles to the upper portion of the contact column.

FIG. 9 is a model diagram showing a cross section taken along the line A—A of FIG. 8.

DETAILED DESCRIPITION OF THE INVENTION

Figure 1:
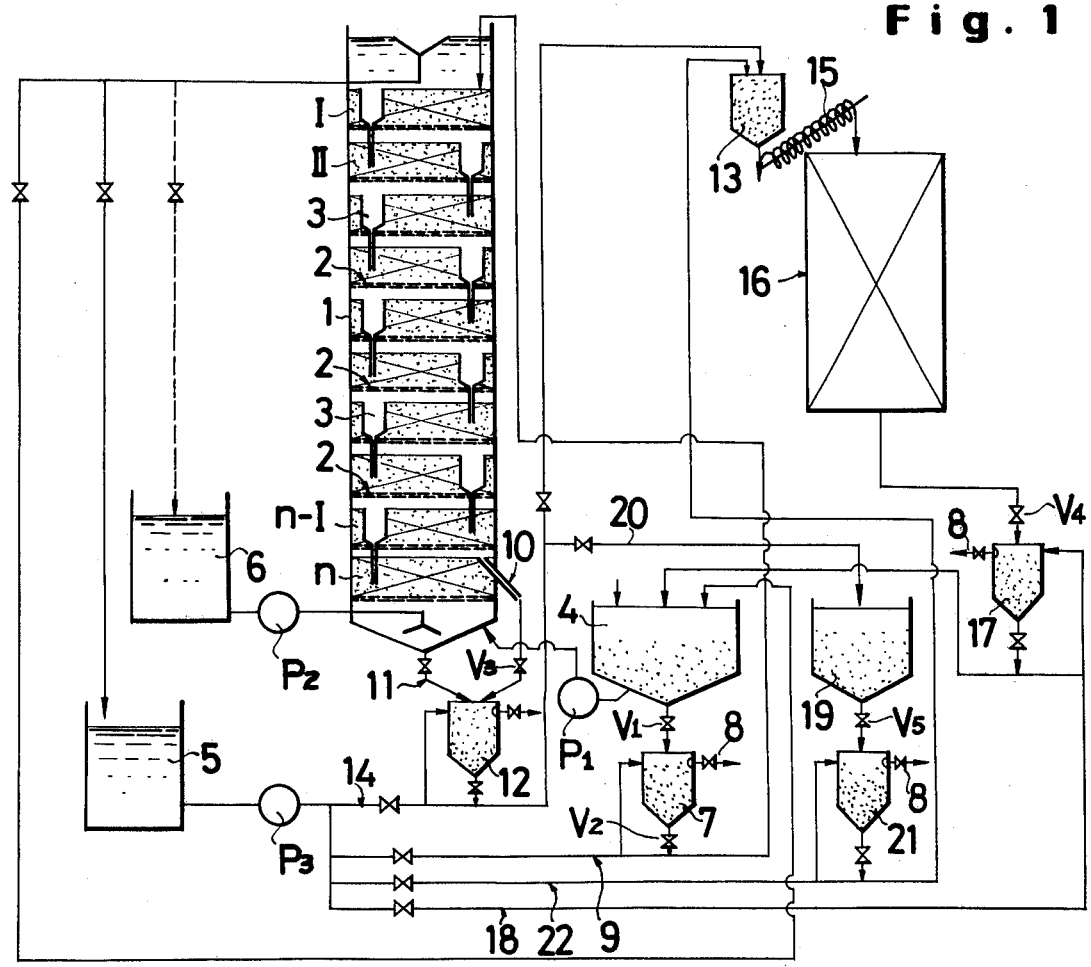
FIG. 1 is a diagram illustrating one preferred embodiment of the apparatus of the present invention.

The present invention will be described with reference to FIG. 1 illustrating the preferred embodiment of this invention. In the diagram, 1 denotes a vertical column and 2 denotes each of the support plates containing many perforations and disposed in the manner of multistage shelves within said vertical column. The support plates each serve to carry thereon a fluidized bed of solid particles. Denoted by 3 is a downcomer pierced through each of the support plates except the one in the lowermost stage. The downcomer has a function such that when solid particles being fluidized on a corresponding support plate comes to exceed a fixed volume, those excess solid particles fall therethrough into the layer of solid particles on the next lower support plate. For this reason, it is necessary that the downcomer 3 have its upper opening at a fixed height from the support plate and its lower opening at a level below that of the upper opening of the downcomer disposed in the next lower support plate. It is also desirable that each support plate be formed of a plurality of component plates containing therein perforations of a diameter larger than the diameter of the individual solid particles, that the perforations in one component plate and those in the other component plate are staggered, and that the upper component plate and the lower component plate are separated from each other by a fixed distance (which is greater than the diameter of solid particles).

A storage tank 4 has a structure which opens into the atmosphere and serves to store solid particles. Transfer of the stored solid particles is desired to be effected in the form of a fluid substance capable of being handled in the same manner as a liquid. In case where solid particles of activated carbon are used in the apparatus of this invention, for example, the activated carbon particles can generally be converted into a slurry state by placing said particles in water in a volume ratio of from 10 to 30% based on water. By the same token, the solid particles may be kept in the storage tank in a state mixed with a liquid as described above, so that the mixture in the form of a fluid substance will be handled in much the same way as a liquid. The fluid substance which can be handled similarly to a liquid will be referred to hereinafter as a "liquid-like fluid." When the liquid-like fluid such as a slurry, for example, is transferred through a pipe, the transfer cannot be carried out smoothly if it contains a gaseous substance. Since the storage tank 4 opens into the atmosphere, the gaseous substance contained in the slurry is allowed to diffuse into the atmosphere. This means that said storage tank concurrently functions as a deaerator.

Now, a description will be made of a method whereby contact layers of solid particles designated as the first (I), second (II), ... $(n-1)$'th and $n$'th stages are formed on the successively lower support plates disposed in the contact column. The slurry containing solid particles stored in the storage tank 4 is delivered by a slurry pump $P_1$ into the contact column via its bottom so that the slurry will flow upwardly through the perforations in the individual support plates in the successively higher stages. Consequently, solid particles collect in the form of a layer on each of the support plates. At this time, the liquid carrier in the slurry separates itself from solid particles and eventually overflows the column head. The overflowing liquid is led into a crude liquid tank 6 or the solid particle storage tank 4. Thus, the contact layers for the I, II ... $(n-1)$'th and $n$'th stages are formed on all the corresponding support plates.

For the treatment of the crude liquid by the present apparatus, the crude liquid in the crude liquid storage tank 6 is transferred by a crude liquid pump $P_2$ into the bottom of the contact column and then caused to flow up through the contact layers in the successively higher stages. Consequently, the treated liquid is obtained on the contact layer in the I (first) stage. The treated liquid is first delivered to the treated liquid tannk 5, from which it is further transferred to places where it is required. As the crude liquid flows through the contact layer in each stage, the contact layer is fluidized and a part of the solid particles from the fluidized contact layer falls through the downcomer 3 in the corresponding support plate down into the contact layer on the next stage below. Thus, solid particles are caused to flow down the interior of the contact column. In consequence of such downward movement of solid particles, is that it becomes necessary to withdraw solid particles gradually through the bottom of the contact column and introduce, by way of replenishment, a supply of solid particles through the head of the column towards the successively lower contact layers. Since the solid particles, during their movement down the column interior, are brought into counterflow contact with the crude liquid which is flowing up the interior of the column to undergo a treatment, their activity or capacity for treating the liquid is degraded more in proportion as they come nearer the bottom of the column.

The first characteristic of the present invention resides in having a first metering tank 7 connected to the solid particle storage tank 4 via a valve $V_1$. In the apparatus of the present invention, the valve $V_1$ is opened for the liquid fluid, namely the slurry containing solid particles (generally the solid particles are prepared in the form of slurry by addition of a liquid such as water, for example), in the storage tank 4 to flow down into the metering tank 7 and the valve $V_1$ is closed after the slurry received therein has reached a fixed volume. The transfer of the slurry containing solid particles from this metering tank 7 to the head of the contact column is made via a pipe 9 shown in the diagram.

In FIG. 1, 5 denotes a treated liquid storage tank and $P_3$ a pump for the transfer of treated liquid. In the piping illustrated in FIG. 1, the contents of the first metering tank 7 are forwarded through the pipe 9 to the first-stage contact layer on the uppermost support plate in the contact column by the operation of the pump $P_3$. The first metering tank 7 is provided with a strainer and a valved pipe 8 concurrently serving to permit escape of interior gas into the atmosphere and to discharge water. In the introduction of the slurry containing solid particles into said metering tank, the valve in the pipe 8 is opened to withdraw water from within the tank. The valve is closed after the metering is completed. The metering is carried out by keeping the valve $V_1$ open and the outflow valve $V_2$ at the base of the metering tank closed. It is completed by closing the valve $V_1$ at the moment that the level gauge (not illustrated) attached to the tank body senses arrival of the level of the slurry at the prescribed height. All the other metering tanks that are used in the present apparatus are identical in structure and permit the fluid liquid or the slurry containing solid particles to be introduced, discharged and metered in entirely the same way as described above.

The metering tank 7 explained above is one of the major features of this invention.

FIG. 1 shows an integral system in which the present invention is put to practical use. Now the present invention will be exlained further with reference to this diagram. Reference numeral 10 denotes a tube disposed downwardly from the upper surface of the contact layer in the lowermost $n$'th stage through the wall of the contact column for the purpose of discharging solid particles. This tube 10 is connected via a valve $V_3$ to a second metering tank 12. As is clear from the diagram, when the tube 10 is incorporated as illustrated, the portion of the solid particles which collect above the level at which the upper end of said tube 10 opens within the column is allowed to fall down the tube interior into the second metering tank, with the result that the upper surface of the contact layer on the $n$'th stage is maintained at a fixed height.

Further, the bottom of the contact column 1 is also connected via a pipe 11 to the second metering tank, so that the solid particles which have fallen onto the bottom space of the contact column are likewise introduced into the second metering tank. The solid particles which are introduced into the second metering tank have already been brought into contact with the liquid under treatment and, therefore, have had their activity degraded generally in consequence of the treatment. Denoted by 13 is a hopper serving to deliver the solid particles of degraded activity into a regeneration unit 16. Means 15 such as a screw conveyor serves the purpose of forwarding said solid particles from the hopper 13 to the regeneration unit 16.

A pipe 14 is laid to connect the treated liquid storage tank 5 and the hopper 13 via the pump $P_3$.

Since the second metering tank is disposed as described above, the volume of solid particles of degraded activity to be forwarded to the hopper 13 can be metered accurately. As already described, the solid particles are transferred in the form of a liquid fluid or slurry (treated liquid) through this pipe. A third metering tank, denoted by 17, is connected to the regeneration unit 16 via the outlet valve $V_4$ and is used for metering the regenerated solid particles.

A pipe 18 is laid to connect the treated liquid tank 5, the third metering tank 17 and the solid particles storage tank 4 via the pump $P_3$.

The solid particles of degraded activity which have been metered by the second metering tank 12 and forwarded by the pump $P_3$ to the hopper 13 via the pipe 14 are introduced by the screw conveyor 15 into the regeneration unit. In the regeneration tank, the solid particles undergo a treatment for regeneration suited to the particular kind of solid particles in use and to the extent of regeneration required. The solid particles whose activity has been restored by the treatment are metered by the third metering tank, then admixed with the treated liquid with the aid of the pump $P_3$ and forwarded in the form of a liquid fluid into the storage tank 4.

A storage tank, denoted by 19, is for storing used solid particles (or degraded activity) and it is connected to a fourth metering tank 21 via a valve $V_5$. The storage tank 19 is connected to a pipe 20 which branches off from the pipe 14 laid to connect the pump $P_3$ and the regeneration hopper 13. This storage tank is used for storing the solid particles of degraded activity suitably in accordance with the volume of degraded solid particles being discharged through the bottom of the contact column and the operating condition of the regeneration unit. The solid particles thus held in the storage tank 19 are forwarded from time to time via the pipe 22 to the hopper of the regeneration unit.

As is clear from the foregoing description and the drawing, the transfer of solid particles is invariably carried out in the form of a slurry or liquid fluid obtainted by incorporation of the treated liquid. The slurry can freely be transferred by the operation of the pump $P_3$, with the valves in the pipes suitably opened or closed. Owing to the provision of the metering tanks 7, 12, 17 and 21, the volumes of solid particles to be introduced and forwarded can be metered out accurately.

Since required metering can be performed accurately and further since the solid particles are transferred invariable in the form of a liquid fluid obtained by incorporation of a liquid, the system can very easily be operated by automatic control when the valves, pumps, metering tanks, contact column and other components are effectively connected both functionally and electrically and automatic control devices therefor are disposed so as to maintain the optimum operating conditions to suit the nature of crude liquid to be treated, the volume of liquid and the properties of the solid particles to be used for the treatment. As examples of the substance of the solid particles to be used for the purpose of this invention, there can be cited granular activated carbon and granular ion-exchange resin. Examples of the crude liquid to be treated thereby include sewage water, industrial wastes and plant effluents.

The description has so far been made with respect to a system depicted in FIG. 1, in which the downcomers are pierced through their respective support plates. Alternatively, the downcomers may be disposted along the lateral sides of their respective support plates, namely along the outer wall of the contact column instead of being pierced through the support plates.

The support plates which are included in the apparatus of the present invention will be explained. The crude liquid to be treated is caused to flow up the interior of the contact column from the bottom as already described. For effective treatment, it is necessary that the crude liquid and the solid particles be brought into contact with each other in as large a contact area as possible. The support plates are intended to carry thereon solid particles and to permit said contact between the solid particles and the crude liquid to be effected in an extremely large contact area. To ensure thorough contact, the support plates have an addtional function of dispersing the crude liquid.

Generally in the known fluidized-bed type multistage contact apparatus, the support plate in each stage is made up of only one perforated plate and the perforations contained in each support plate have a diameter smaller than the diameter of the solid particles so that the solid particles carried on the support plate will not fall readily from the plate.

For a given weight of solid particles, the surface area thereof and consequently the contact effect increase in proportion as the particle diameter decreases. For this reason, the solid particles used in such conventional apparatus are generally small and, accordingly, the perforations contained in the support plates therein are extremely small. If the crude liquid under treatment happens to contain a suspended matter, the fine perforations in the support plates are blocked up by such suspended matter to seriously hinder the practical use of the apparatus. This explains why the fluidized-bed type multistage contact apparatus is predominantly used for solid-gas contact and not for solid-liquid contact notwithstanding the fact that it is capable of notably high contact efficiency between two fluids moving in opposite directions. In the apparatus of the present invention, therefore, each of the support plates is made up of two component plates containing perforations of a diameter larger than that of the solid particles so that, if the crude liquid contains suspended matter, the perforations will not be blocked up by the suspended matter, and said two component plates are disposed at a fixed vertical distance in such a relation that the perforations in the upper component plate and those in the lower component plate are staggered with respect to each other in the horizontal direction.

In the case ordinary activated carbon particles measuring 0.2 to 1.6mm in diameter are used as solid particles in the fluidized-bed type contact apparatus, for example, it is satisfactory that the size of each perforation be with 20% of the inside diameter of the contact column and fall within the range of from 10 to 150mm.

FIG. 2 is an explanatory model diagram illustrating one preferred embodiment of the aforementioned support plate according to the present invention. In the diagram, 23 stands for an upper perforated plate and 24 for a lower perforated plate which together compose one support plate. The two component perforated plates are kept at a vertical distance of H by a spacer 25. Perforations 23' in the plate 23 and a perforations 24' in the plate 24 are staggered with respect to each other in the horizontal direction.

The following is a standard formula representing the relationship between the kind of solid particles, the distance between adjacent perforations and the diameter of perforations on one hand and the value of H on the other hand.

$$H \leq \frac{L - (d_1 + d_2)}{2} \tan\theta$$

wherein, $L$ is the pitch between adjacent perforations (in mm); $d_1$ is the diameter of perforations in the upper support plate (in mm); $d_2$ is the diameter of perforations in the lower support plate (in mm); and $\theta$ is the angle of repose of the solid particles (in degrees).

Now, let $\epsilon(\%)$ stand for the ratio of perforations in each support plate, $d$ for the diameter of the perforations in the upper and lower component plates and $\theta$ for the angle of repose of the solid particles, and the vertical distance H' between the two adjacent support plates will be represented by the following formula:

$$H' \leq (5\sqrt{\frac{\pi}{2}} \frac{1}{\sqrt{\epsilon}} - 1)d \cdot \tan\theta$$

When each support plate is made up of two perforated component plates as described above, solid particles which separate from the contact layer formed on the support plate and fall through the perforations in the upper component plate onto the lower component plate are allowed to collect in heaps of the shape to be described below. To be specific, such solid particles fall through the perforations 23' of the upper perforated plate 23 onto the lower perforated component plate 24 and collect thereon in the shape of heaps defined by $\theta$, the angle of repose. When the system is put into operation after formation of these heaps of solid particles, absolutely none or very few of the solid particles fall off the support plate if the crude liquid is passed in the directions shown by the arrows in the diagram of FIG. 2, insofar as the operation is carried out under normal conditions. Of course, discontinuation of the passage of the crude liquid does not cause the solid particles to fall off the support plate.

In the actual operation of the appratus of this invention, the crude liquid is fed so as to flow up the interior of the contact column. If the apparatus is operated so that the liquid flows down the contact column, then the solid particles fall downwardly through the successively lower stages as a natural consequence.

The operation of the contact column which incorporates the support plates described above will be described.

In the apparatus of this invention, the crude liquid to be treated is introduced upwardly through the bottom of the contact column and the solid particles are delivered downwardly through the head of the column as already described. The upward flow of the crude liquid is accomplished through the perforations bored in the support plates and the downward movement of the solid particles proceeds by the medium of the downcomers disposed through the support plates.

The solid particles are caused to form a fluidized bed by virtue of the upward flow of the crude liquid. The fluidized bed thus formed is homogeneous so long as the solid particles in use are uniform in specific gravity and particle diameter. Said uniformity also warrants smooth fall of liberated solid particles through the downcomers. If the solid particles in use are not uniform in specific gravity and particle diameter, then the fluidized bed of solid particles formed as described above is not always homgeneous. In this case, there is a conspicuous trend that solid particles of a smaller diameter move down the column interior through the downcomers and solid particles of a larger diameter remain at the bottom of each contact layer. This phenomenon entails degradation of the performance of the contact column and, furthermore, makes it necessary to move the solid particles remaining at the bottom of contact layers down the contact column by some means or other. This is accomplished by imparting a partial downward current to the support plates so as to force the retained solid particles out of the contact layers. For example, such solid particles may sufficiently be removed by allowing them to fall through the perforations in the lower perforated component plate 24 of FIG. 2.

Complete withdrawal of all the solid particles from the contact column can easily be accomplished by causing a liquid to flow down the interior of the contact column so that the solid particles will immediately collect in the bottom of the column.

FIG. 3 and FIG. 4 are explanatory model diagrams of preferred embodiments of the support plate for use in the contact column of the present invention. In the unit support plate of FIG. 3, although the perforations in the two component plates are of an identical diameter, those in the lower component plate are distributed more densely than in the upper component plate. In the unit support plate of FIG. 4, the perforations in the upper component plate have a smaller diameter than those in the lower component plate so that the ratio of perforations is greater in the lower component plate than in the upper one. Of course, it is permissible to combine greater distribution density and greater perforation ratio in one, i.e., to have perforations of a greater diameter distributed in a higher density in the lower component plate than in the upper one. It is seen from the foregoing formula that the vertical distance between the two component plates in the unit support plate should be decreased to some extent when the ratio of perforations is increased in the lower perforated component plate.

Where the ratio of perforation is greater in the lower perforated component plate than in the upper one, the amount of solid particles which remain in the packed layer on the upper plate instead of falling onto the lower plate is small as compared with that experienced in the unit support plate of FIG. 2. If the apparatus is suspended from operation for a long time, there is a possibility in the unit support plate of FIG. 2 that the large amount of solid particles remaining in the packed layer will conglomerate and consequently block up the perforations in the upper and lower perforated component plates. When the lower component plate is given a greater ratio of perforations than in the upper one, this possibility is greatly precluded because the amount of solid particles remaining in the packed layer is decreased.

Furthermore, there exists a correlation between the ratio of perforations and the resistance offered to the liquid. The fluidized movement of solid particles proceeds more favorably in proportion as the resistance offered by the perforated plates to the liquid increases.

To maintain the fluidized beds of solid particles in a desirable condition, the following requirements must be satisfied.

First, the perforations in the upper component plate of the unit support plate should have a diameter greater than that of solid particles and they should be distributed sparsely enough to give a sufficiently small ratio of perforations to the unit support plate as a whole. Having such a small ratio of perforations, the support plate will give a high resistance to the liquid and permit the fluidization of solid particles to proceed smoothly and, at the same time, minimize possible fall of solid particles from the upper component plate to the lower one.

When a higher ratio of perforations is given to the lower component plate than to the upper one, the contact column operates quite smoothly as a whole even if the solid particles are non-uniform in specific gravity and particle diameter and, consequently, insufficient contact is obtained between the solid particles in their fluidized state and the liquid.

The downcomers will now be described.

Of the solid particles which may be used for the treatment by solid-liquid contact contemplated by the present invention, the most popular are activated carbon particles having a particle diameter of from 0.3 to 0.8mm and a specific gravity of about 1.3.

During the operation of the contact column, the upward flow of the crude liquid within the interior of the contact column is in principle effected through the perforations in the support plates. The crude liquid, however, frequently finds its way up through the downcomers which are primarily intended for downward passage of solid particles. If the downcomers have a uniform inside diameter throughout their entire height and if the solid particles have a particularly small diameter, then the upward flow of the liquid may be forceful enough to prevent the solid particles from entering the tubes and hence obstruct smooth fall of solid particles. In this case, the solid particles collect at certain positions inside the contact column or, at times on the support plates in the lower stages, only the downward movement of solid particles occurs preponderantly and no replenishing movement of solid particles ensures, eventually giving rise to portions of the apparatus which are totally devoid of solid particles.

FIG. 5 is an explanatory model diagram illustrating one preferred embodiment of the downcomer which is free from the various disadvantages mentioned above. The cross-sectional area of the bore in each downcomer 3 is greater in the upper half portion 26 than in the lower half portion 27. In the drawing, the upper half portion is shown to have a larger outside diameter and the lower half portion to have a smaller outside diameter. It should be noted, however, that such difference in outside diameter is not required for the present invention. This means that the downcomer may have a uniform outside diameter throughout its entire height insofar as the inside diameter alone is greater in the upper half portion than in the lower half portion. Alternatively, a cylinder of a larger diameter may be used to form the upper half portion and another cylinder of a smaller diameter to form the lower half portion respectively and they may be joined by interposing a doughnut-shape joint therebetween. It is also permissible to form the upper half portion in the shape of a funnel having a larger diameter at the upper end and a smaller diameter at the lower end and form the lower half portion in the shape of a cylinder having a small diameter. Otherwise, the entire downcomer may be formed in the shape of a funnel gradually narrowed down from a larger diameter at the upper end to a smaller diameter at the lower end.

So long as the downcomer has a bore the cross-sectional area of which is greater in the upper half portion 26 than in the lower half portion 27 as described above, a liquid finding its way through the tube will flow up the tube at a lower flow velocity in the upper half portion having a larger cross-sectional area than in the lower half portion. Because of the fact that the downcomer has a larger opening at the upper end coupled with the fact that the flow velocity of a liquid flowing up the tube is lower in the upper half portion, a large portion of the solid particles fluidized in the region above the level of the upper end of the downcomer is allowed to enter the tube. The large portion of the solid particles which has entered the tube now serves to preclude the crude liquid from finding its way through the tube from the lower end of the lower half portion of the tube. Consequently, the entire crude liquid has no alternative but to flow upwardly through the contact layers and fluidize the solid particles in said contact layers. Because of the formation of fluidized beds, the solid particles are brought into ample contact with the crude liquid and the crude liquid, therefore, undergoes a chemical or physical action caused by the solid particles and, moreover, the solid particles are continuously moved to the contact layers in the successively lower stages. Of course, the volume of solid particles to be moved per unit time can be fixed within a wide range in accordance with the cross-sectional areas of the tube in the upper half portion and in the lower half portion and the ratio of the two cross-sectional areas as well. Generally, the performance of the system as a whole and other similar factors are taken into account and the cross-sectional area of the bore of the downcomer in the upper half is so selected as to be from 2 to 30 times as great as that in the lower half portion, so that the transfer of solid particles can be stably accomplished at a prescribed rate, particularly good performance being obtained in the range of from 5 to 15 times. For unobstructed movement of solid particles, the two half portions 26 and 27 are desired to be connected smoothly by inserting a border zone 28 of the shape of an inverted cone therebetween.

FIG. 6 is n explanatory model diagram illustrating another preferred embodiment of the downcomer of the present invention. It is similar to the conventional downcomers in the sense that it is straight. However, it is pierced through the support plate 2 at an angle of $\theta_1$ with reference to a horizontal plane.

In the case of a tube having a circular cross section, if the tube is disposed in an inclined manner through the support plate as described above, the upper opening of this tube assumes an elliptical shape in the horizontal direction and, therefore, offers a larger area of opening. This means that when the downcomer is disposed in an inclined manner, the solid particles enter the tube more easily than when the tube is disposed vertically through the support plate. Furthermore, when the liquid attempts to flow up the tube interior, it will slide along the upper inside wall 29 of the slanted tube In accordance with the principle of the slanted-plate type solid-liquid separation system, therefore, the solid particles are smoothly transferred along the lower inside wall 30 of the slanted tube toward the lower stage. Since in this manner, a large volume of solid particles enter the slanted tube, they serve the purpose of obstructing the liquid from flowing up the tube interior in the same way as in the tube of FIG. 5.

The volume of solid particles which pass through the downcomer is determined by the cross-sectional area of the tube and the angle of inclination, $\theta_1$, of the tube. It can be selected as desired, therefore, by fixing the diameter and the inclination of in of the tube while taking into consideration the particular kinds of liquid and solid particles in use.

FIG. 7 is an explanatory model diagram illustrating still another preferred embodiment of the downcomer according to this invention. The downcomer in this case has a greater cross-sectional area in the upper half portion 26 then in the lower half portion 27 and it is inclined by an angle of $\theta_2$ with reference to a horizontal plane. This represents a combined model of the downcomer of FIG. 5 and that of FIG. 6. Thus, the principles of FIG. 5 and that of FIG. 6 are utilized to advantage, enhancing the effect to a remarkable extent.

The present invention has been explained with reference to several typical illustrated embodiments. It goes without saying that the downcomers for use in the apparatus according to this invention are not limited to circular cross section but may be of angular cross sections.

Now, an explanation will be made of means for delivering solid particles to the contact column. Generally the solid particles are transferred in the form of a slurry or liquid fluid obtained by incorporation of a liquid as already described. The slurry is introduced downwardly into the contact column through the head of said column.

One possible means is a solid particle storage tank which is provided at its bottom with a rotary valve and which is installed above the contact column, so that the solid particles stored in this tank can be introduced gravitationally into the contact column by opending said rotary valve. This storage tank has a disadvantage that solid particles are susceptible to disintegration due to the movement of the rotary valve.

Another possible means is allowing the forward end of a pipe from the solid particle storage tank to enter vertically and open in the liquid phase which exists either inside or above the packed layer of solid particles on the uppermost support plate. In this case, however, there is a fair possibility that the incoming solid particles will disturb the state of equilibrium inside the contact column and, consequently, a part of the solid particles composing the contact layer will go astray and enter the liquid which has undergone the treatment and is ready to be withdrawn from the uppermost contact layer.

The present invention has been accomplished with a view to eliminating these disadvantages. To be specific, this invention causes the forward end of a pipe from the solid particle storage tank to open in a horizontal direction into the contact layer on the uppermost stage.

FIG. 8 and FIG. 9 are preferred embodiments of the apparatus according to the present invention. More specifically FIG. 8 is a cross-sectional model diagram illustrating a transfer pipe for delivering solid particles to the head of the contact column. FIG. 9 is a sectional view taken along the line A—A of FIG. 8. The lower end portion 32 of the transfer pipe 31 which descends into the contact column is bent in the horizontal direction within the contact layer for the I (first) stage. Said portion is provided at its tip with a nozzle 33 which opens in the tangential direction or along the circumferential direction near the inside wall of the column. Otherwise, a transfer pipe may be vertically extended to a proper depth along the axis of the contact column and a hollow disk may be attached to the lower end of said transfer pipe, with nozzles disposed radially on said disk in the horizontal direction.

This transfer pipe is constructed so that solid particles are discharged through the lower end of the transfer pipe horizontally into the contact layer without disturbing the contact layer itself and the equilibrated condition of the contact column interior as a whole. Prevention of possible disturbance of the equilibrated condition is accomplished more effectively by giving a particularly large cross section to the nozzle disposed at the forward end of the transfer pipe so as to sufficiently decrease the linear velocity at which the slurry containing solid particles flows out of the nozzle in the horizontal direction. For practical use, the nozzle is not limited to the illustrated shape. A nozzle such as of cheese manifold adapted to uniformalize the flow may be adopted to suit the occasion.

What is claimed is:

1. An improved fluidized-bed type multistage solid-liquid contact apparatus, comprising in combination:
    a contact column consisting of a vertical column, support plates disposed horizontally in a plurality of stages within said column, possessed of a multiplicity of perforations and, with the exception of the particular support plate in the lowermost stage, each having a downcomer adapted to permit communication between the upper side and the lower side of the support plate, and solid particles piled up on each of said support plates,
    a crude liquid storage tank for accommodating a crude liquid to be supplied to said contact column,
    means for delivering said crude liquid from said crude liquid storage tank to the space below the lowermost support plate within said contact column,
    a treated liquid tank for accommodating the liquid to be discharged from said contact column.
    means for forwarding the treated liquid from the space above the uppermost support plate within said contact column to the treated liquid tank, and
    solid particles supply means for delivering solid particles onto the support plate on the uppermost stage in said contact column and solid particles withdrawal means for withdrawing solid particles out of the lower portion of said contact column,
    said solid particles supply means incorporating therein a solid particles storage tank which is provided with a metering tank for metering solid particles for delivery to said contact column,
    said support plates are each made up of a plurality of component plates spaced by a fixed distance, said component plates containing perforations of a diameter greater than that of the solid particles piled up thereon, said perforations in the upper component plates and those in the lower component plate being in staggered relationship,
    said perforations bored in each support plate each having a diameter not exceeding 20 percent of the inside diameter of said contact column but falling in the range of from 10 to 150 mm,
    the upper half portion of said downcomers each having a greater inside cross-sectional area than that of the lower half portion, and
    said downcomer of each support plate has its lower aperture at a level lower than the upper aperture of the downcomer of the next lower support plate.

2. The apparatus according to claim 1, wherein the solid particles withdrawal means additionally incorporates therein a solid particles storage tank which includes a metering tank operatively connected thereto for metering solid particles discharged from the contact column.

3. The apparatus according to claim 1, wherein each support plate is so perforated that the ratio of the combined area of perforations to the total overall area of the plate is greater in tne lower component plate than in the upper component plate.

4. The apparatus according to claim 1, wherein the downcomers are disposed piercingly through their respective support plate.

5. The apparatus according to claim 1, wherein the downcomers are disposed in an inclined manner with reference to their respective support plates.

6. The apparatus according to claim 1, wherein the solid particles supply means incorporates therein a pipe which extends horizontally parallel to the support plate in the uppermost stage of the contact column.

* * * * *